(12) United States Patent
Shichijyo

(10) Patent No.: US 6,800,974 B2
(45) Date of Patent: Oct. 5, 2004

(54) LEAD-WIRE ARRANGEMENT OF VEHICLE AC GENERATOR

(75) Inventor: Akiya Shichijyo, Ama-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/338,825

(22) Filed: Jan. 9, 2003

(65) Prior Publication Data

US 2003/0102736 A1 Jun. 5, 2003

Related U.S. Application Data

(62) Division of application No. 09/429,935, filed on Oct. 29, 1999, now Pat. No. 6,617,723.

(30) Foreign Application Priority Data

Feb. 5, 1999 (JP) ................................. 11-28192

(51) Int. Cl.[7] ........................ H02K 11/00; H02K 1/00; H02K 3/00
(52) U.S. Cl. ...................... 310/71; 310/179; 310/68 D
(58) Field of Search ..................... 310/71, 179, 68 D, 310/60 R, 60 A, 168, 146, 234, 249; 363/141, 144, 145

(56) References Cited

U.S. PATENT DOCUMENTS

| | | | |
|---|---|---|---|
| 3,970,881 A | 7/1976 | Sato | 310/239 |
| 4,189,653 A | 2/1980 | Hiratuka et al. | 310/68 D |
| 4,259,603 A | 3/1981 | Uchiyama et al. | 310/68 B |
| 4,951,379 A | 8/1990 | Clemenz | 29/597 |
| 5,043,614 A | 8/1991 | Yockey | 310/68 D |
| 5,070,270 A | 12/1991 | Morikane | 310/239 |
| 5,122,705 A * | 6/1992 | Kusase et al. | 310/68 D |
| 5,148,072 A | 9/1992 | Shiroyama | 310/239 |
| 5,350,960 A | 9/1994 | Kiri et al. | 310/194 |
| 5,455,500 A * | 10/1995 | Shichijyo et al. | 322/90 |
| 5,519,273 A * | 5/1996 | Keck | 310/71 |
| 5,602,957 A | 2/1997 | Wille et al. | 380/836 |
| 5,610,467 A | 3/1997 | Shiah et al. | 310/239 |
| 5,640,062 A * | 6/1997 | Yockey | 310/68 D |

(List continued on next page.)

FOREIGN PATENT DOCUMENTS

| | | |
|---|---|---|
| DE | 197 15 925 A | 11/1997 |
| FR | 2 164 711 A | 8/1973 |
| GB | 1 043 555 A | 9/1966 |
| JP | 4-010574 | 1/1992 |
| JP | 4-026346 | 1/1992 |
| JP | 4-165949 | 6/1992 |
| JP | 4-07302723 | 11/1995 |
| JP | 7-336974 | 12/1995 |
| JP | 4-09023609 | 1/1997 |
| WO | 92/06527 | 4/1992 |
| WO | 98/54823 | 12/1998 |

OTHER PUBLICATIONS

U.S. patent application 09/039,480, Umeda et al. issued as U.S. patent 5,998,903 on Dec. 7, 1999.

Primary Examiner—Tran Nguyen
Assistant Examiner—Julio C. Gonzalez
(74) Attorney, Agent, or Firm—Oliff & Berridge, PLC

(57) ABSTRACT

An ac generator for a vehicle includes a multi-poled rotor, a stator having a multi-phase stator winding which has output lead wires, a full-wave rectifier unit, and a frame having a wall supporting the stator at one side thereof and the rectifier unit at the other side. The output lead wires are grouped to form a plurality of bundles. The wall has lead-wire-holes formed to correspond to the bundles. The rectifier unit has input terminals disposed to correspond to the bundles and respectively connected to the output lead wires.

5 Claims, 8 Drawing Sheets

U.S. PATENT DOCUMENTS

| | | | |
|---|---|---|---|
| 5,682,070 A * | 10/1997 | Adachi et al. | 310/71 |
| 5,744,892 A | 4/1998 | Mukai et al. | 310/251 |
| 5,878,480 A | 3/1999 | Rawls | 29/597 |
| 5,883,450 A | 3/1999 | Abadia et al. | 310/68 D |
| 5,895,990 A | 4/1999 | Lau | 310/57 |
| 5,914,546 A * | 6/1999 | Terakado et al. | 310/71 |
| 5,949,166 A | 9/1999 | Ooiwa et al. | 310/68 D |
| 5,977,669 A | 11/1999 | Yoshida et al. | 310/68 D |
| 5,986,379 A | 11/1999 | Hollenbeck et al. | 310/257 |
| 5,998,903 A * | 12/1999 | Umeda et al. | 310/179 |
| 6,107,710 A | 8/2000 | Gamboa | 310/67 R |
| 6,121,699 A | 9/2000 | Kashihara et al. | 310/68 D |
| 6,133,665 A | 10/2000 | Prell et al. | 310/239 |
| 6,144,136 A * | 11/2000 | Umeda et al. | 310/254 |
| 6,160,335 A | 12/2000 | Ishida et al. | 310/68 D |
| 6,184,602 B1 | 2/2001 | Ooiwa et al. | 310/68 D |
| 6,198,190 B1 * | 3/2001 | Umeda et al. | 310/179 |
| 6,211,594 B1 * | 4/2001 | Umeda et al. | 310/180 |
| 6,252,320 B1 | 6/2001 | Ballard et al. | 310/68 D |
| 6,271,608 B1 * | 8/2001 | Haydock et al. | 310/71 |
| 6,275,404 B1 | 8/2001 | Shichijyo et al. | 363/145 |
| 2002/0060502 A1 | 5/2002 | Irie | 310/71 |

* cited by examiner

LEAD-WIRE ARRANGEMENT OF VEHICLE AC GENERATOR

CROSS REFERENCE TO RELATED APPLICATION

This is a Division of application Ser. No. 09/429,935 filed Oct. 29, 1999 now U.S. Pat. No. 6,617,723.

CROSS REFERENCE TO RELATED APPLICATION

The present application is based on and claims priority from Japanese Patent Application Hei 11-28192 filed on Feb. 5, 1999, the contents of which are incorporated herein by reference.

BACKGROUND OF THE INVENTION

1. Field of the Invention

The present invention relates to an ac generator for a vehicle, and particularly to a stator lead-wire arrangement of an ac generator.

2. Description of the Related Art

JP-A-4-165949 and JP-A-4-26345 disclose ac generators which have a frame, a stator, a rotor, a rectifier unit, a brush unit, and a voltage regulator. The stator has a three-phase stator winding and accommodated inside the frame, and the rectifier unit is fixed outside the frame. In this type of ac generator, it is necessary to have a plurality of lead-wire-holes at a wall of the frame for a plurality of lead wires extending from the stator winding through the frame to be connected to the rectifier unit.

As the number of holes increases, the wall becomes more uneven, thereby causing a loud fan noise. Moreover, because the number of insulators to be inserted into the holes increases, the production cost increases.

SUMMARY OF THE INVENTION

A main object of the invention is to provide an improved lead-wire arrangement of an ac generator for a vehicle.

Another object of the invention is to provide an ac generator which has an inexpensive structure for suppressing a fan noise.

According to a preferred embodiment of the invention, an ac generator including a stator having a multi-phase stator winding, a rectifier unit, a frame having a wall supporting the stator at one side thereof and the rectifier unit at the other side. The wall has a minimal number of lead-wire-holes for the output lead wires. Terminal members may be disposed in the lead-wire-holes for holding the output lead wires.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
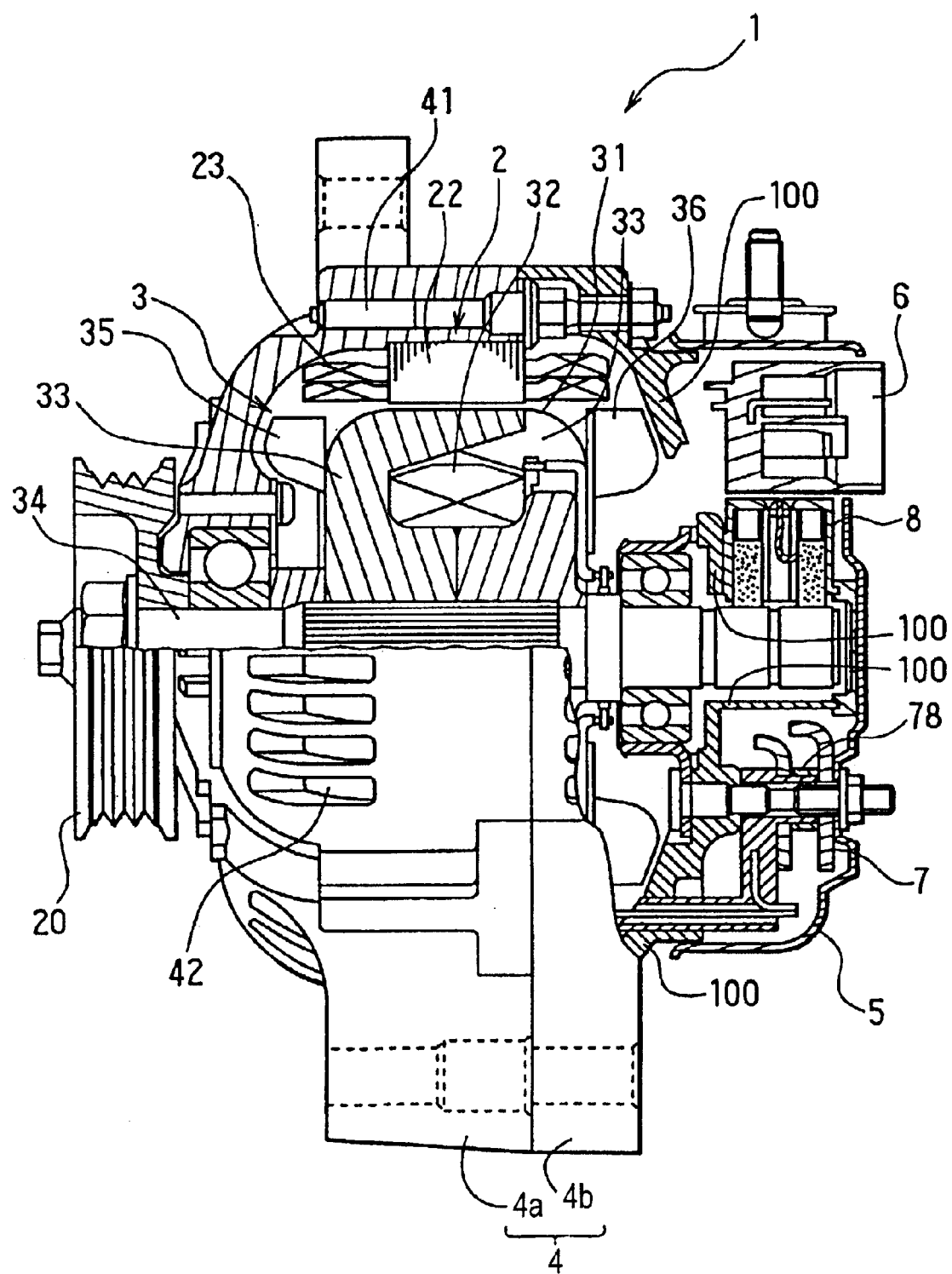
FIG. 1 is a partially cross-sectional side view of an ac generator for a vehicle according to a preferred embodiment of the invention.

As shown in FIG. 1, ac generator 1 for a vehicle according to a preferred embodiment of the invention includes stator 2 having 96 slots at the inner periphery thereof, rotor 3 having sixteen claw poles, frame 4, rectifier unit 7, pulley 20 and others. The ac generator provides dc output power, when pulley 20 is rotated by an engine through a V-belt (not shown) in a well-known manner.

Figure 2:
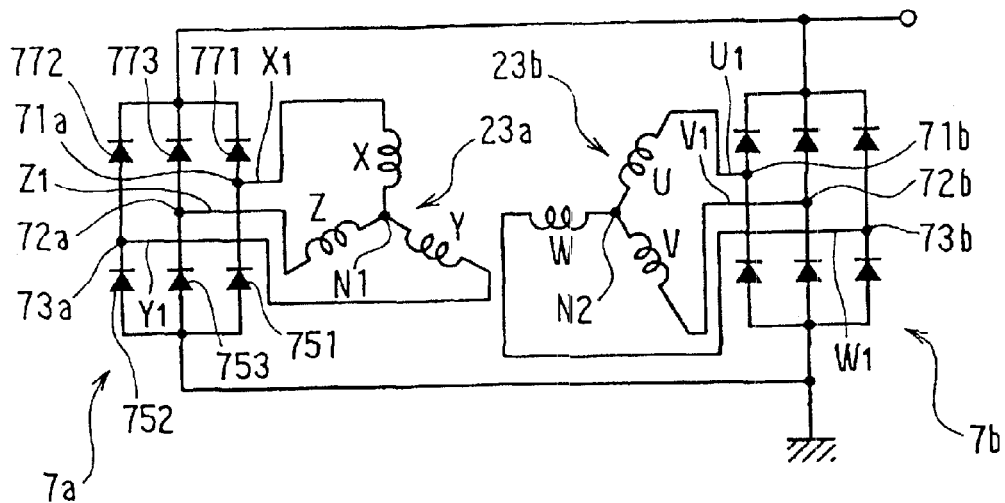
FIG. 2 is a schematic circuit diagram of the ac generator shown in FIG. 1.

Stator 2 has stator core 22 and stator winding 23 with magnet wires disposed in the stator's slots. Stator winding 23 is composed of first three-phase star-connected winding 23a and second three-phase star-connected winding 23b. They are shifted from each other by an electric angle of 30° or one slot-pitch. First winding 23a has three phase-windings X, Y and Z which are connected with each other at their one ends to form first neutral point N1, and second winding 23b has three phase-windings U, V and W which are connected with each other at their one ends to form second neutral point N2, as shown in FIG. 2. Each phase-winding has eight two-turn coils disposed in the slots at equal intervals and four wires are disposed in each slot.

Rotor 3 has pole core 31, field coil 32, mixed-flow-type front cooling fan 35, and centrifugal rear cooling fan 36. Pole core 31 has eight claw poles 33 alternately interleaved with each other to form an eight-pole rotor. Field coil 32 is enclosed by claw poles 33 in a well-known manner.

Frame 4 supports stator 2 and rotor 3 so that rotor 3 can rotate with rotor shaft 34 inside stator 2. Frame 4 is composed of front frame 4a and rear frame 4b, which are fastened by four bolts 41. Frame 4 has air-discharge windows 42 at the portions thereof opposite the coil-ends of stator winding 23 and air-intake windows at the central portions thereof.

Voltage regulator 6, rectifier unit 7, brush unit 8 are respectively fixed to the rear wall surface of an end wall 100 of rear frame 4b and covered by rear cover 5.

As shown in FIG. 2, rectifier unit 7 is composed of a pair of full-wave three-phase bridge circuits 7a and 7b, which are respectively connected to stator winding 2 via output lead wires X1, Y1, and Z1 respectively extending from three phase-windings X, Y, Z of first winding 23a at input portions 71a, 72a, and 73a and via output lead wires U1, V1, and W1 respectively extending from three phase-windings U, V and W of second winding 23b at input portions 71b, 72b and 73b. First neutral point N1 is formed by neutral lead wires X2, Y2, and Z2 respectively extending from three phase-windings X, Y, Z, and the second neutral point N2 is formed by neutral lead wires U2, V2, and W2 respectively extending from three phase-windings U, V, and W.

Figure 3:
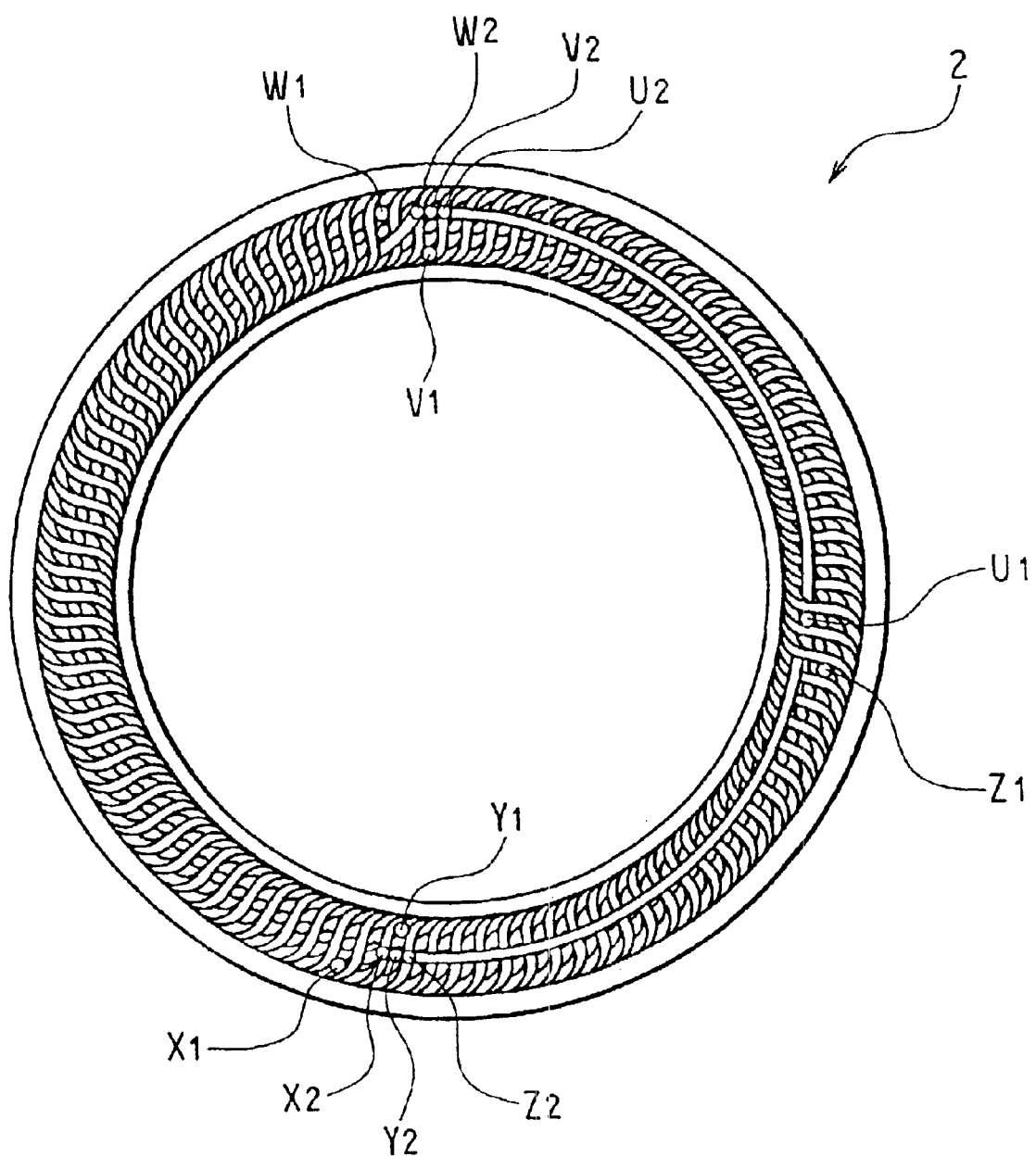
FIG. 3 is a plan view illustrating a stator with a stator winding.

As shown in FIG. 3, output lead wires X1 and Y1 of first winding 23a respectively extend from portions close to each other to form a first bundle of output lead wires, while output lead wire Z1 of the same winding extends from a portion remote from the former portions. Neutral lead wires X2, Y2 and Z2 respectively extend from portions close to the portions from which output lead wires X1, Y1, and Z1 extend. Neutral lead wire Z2 further extends clockwise along the axial end surface of the circumferential coil-ends to the portions from where the other neutral lead wires X2 and Y2 of first winding 23A extend. Three neutral lead wires X2, Y2 and Z2 of first winding are welded or soldered to each other to form first neutral point N1.

Output lead wires V1 and W1 of second winding 23b respectively extend from portions close to each other to form a second bundle of output lead wires, while output lead wire U1 of the same winding extends from a portion remote from the former portions but close to output lead wire Z1 to form a third bundle of output lead wires. Neutral lead wires U2, V2 and W2 respectively extend from portions close to the portions from which output lead wires U1, V1, and W1 extend. Neutral lead wire U2 further extends counter-clockwise along the axial end surface of the circumferential coil-ends to the portions from where the other neutral lead wires V2 and W2 of second winding 23b extend. Three neutral lead wires U2, V2 and W2 of second winding 23b are welded or soldered to each other to form second neutral point N2. Thus, two neutral points N1 and N2 can be formed at the coil-end portions remote from each other. This simplifies the connection work.

Figure 4:
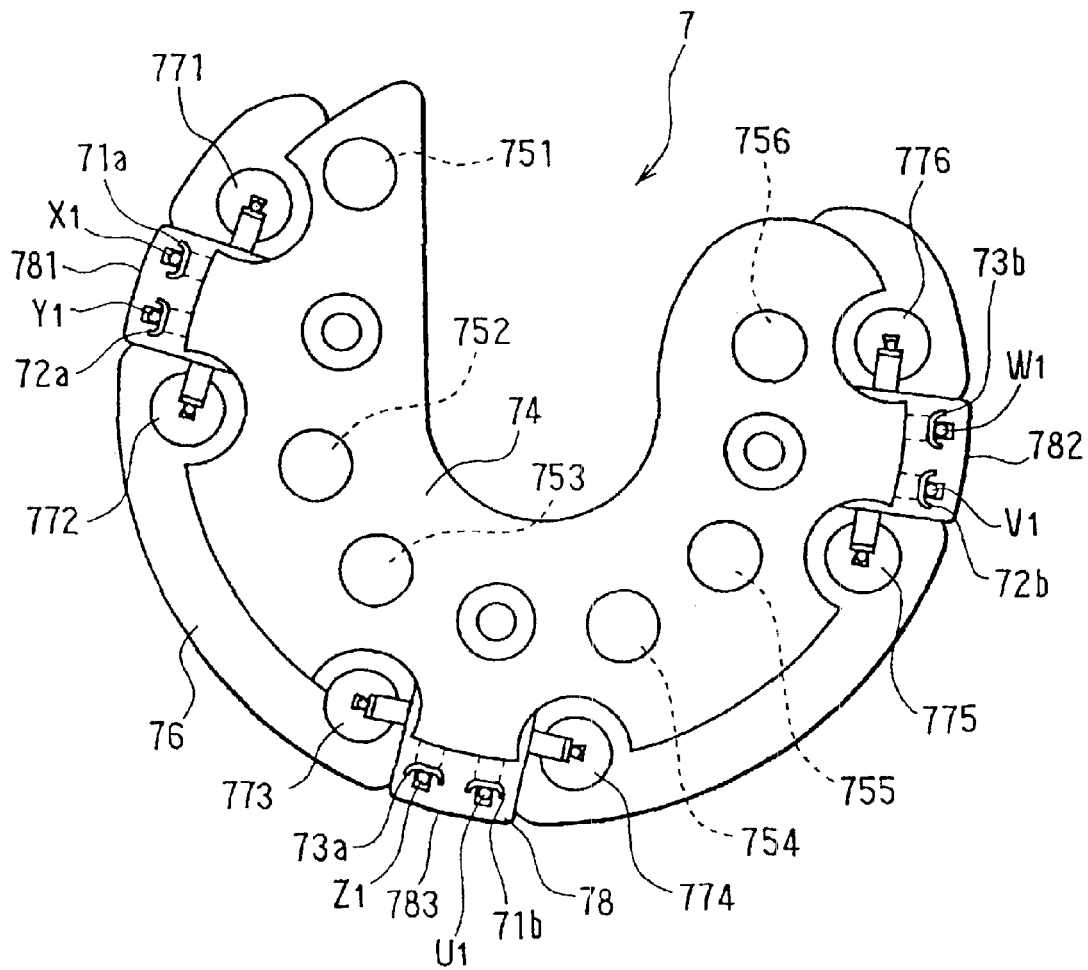
FIG. 4 is a schematic plan view of a rectifier unit of the ac generator.

As shown in FIG. 4, rectifier unit 7 includes arc-shaped negative cooling fin 74 holding six negative-side diodes 751–756, arc-shaped positive cooling fin 76 holding six positive-side diodes 771–776, and connection unit 78 disposed between negative cooling fin 74 and positive cooling fin 76. Connection unit 78 spaces and insulates the cooling fins from each other, and also connects each diode to respectively form full-wave three-phase bridge circuits 7a and 7b. Bridge circuit 7a is composed of three negative-side diodes 751–753 and three positive-side diodes 771–773 which are disposed at the left section of rectifier unit 7, and bridge circuit 7b is composed of three negative-side diodes 754–756 and three positive-side diodes 774–775 which are disposed at the right section of rectifier unit 7.

Connection unit 78 has three terminal members 781, 782, and 783 spaced apart from one another along the arc-shaped periphery thereof. They connect output lead wires X1, Y1, Z1, U1, V1, and W1 to respective rectifier bridge circuits 7a, and 7b.

First terminal member 781 is located near negative diodes 751, 752 and positive diodes 771, 772 and near the first bundle of output lead wires X1 and Y1; second terminal members 782 is located near negative diodes 755, 756 and positive diodes 775, 776 and near the second bundle of output lead wires V1 and W1; and the third terminal members 783 is located near negative-side diodes 753, 754 and positive-side diodes 773, 774 and near the third bundle of output lead wires Z1 and U1. Thus, three circuit groups are disposed regularly in the circumferential direction.

Figure 5:
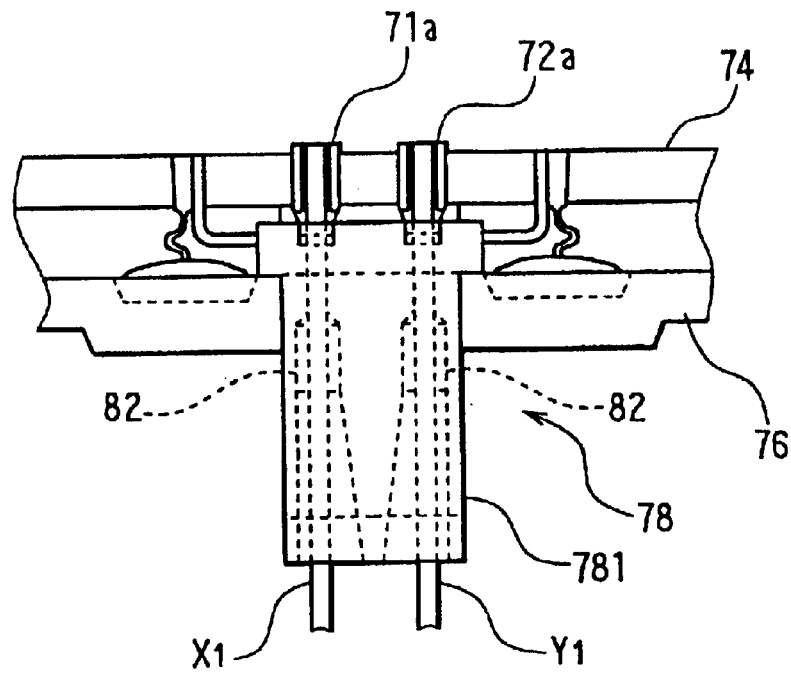
FIG. 5 is a fragmentary front view illustrating a connection unit of the rectifier unit.
Figure 6:
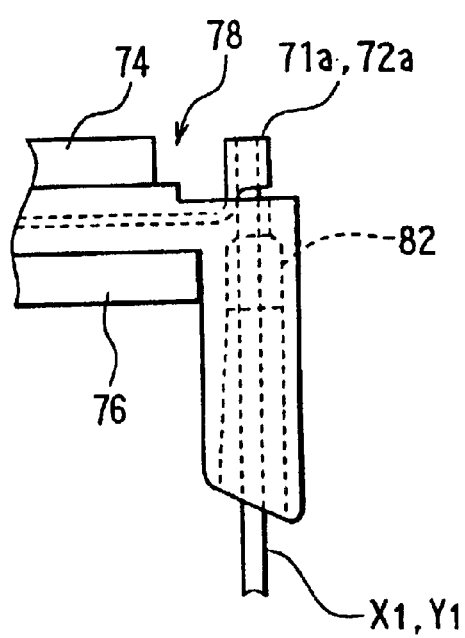
FIG. 6 is a fragmentary side view illustrating the connection unit of the rectifier unit.

As shown in FIGS. 5 and 6, first terminal member 781 has a pair of terminals 71a and 72a and a columnar-terminal member extending in the axial direction. The columnar terminal member has a pair of bell-bottomed concavities 82 therein to respectively hold the output lead wires X1 and Y1 and introduces them to the pair of terminals 71a, 72a. Concavity 82 becomes gradually wider at the open end so that the lead wires can be easily inserted therein. Terminal 71a connects output lead wire X1 to the junction of negative-side diode 751 and positive side diode 771, and terminal 72a connects output lead wire Y1 to the junction of negative-side diode 752 and positive-side diode 772. The connection is carried out by soldering, welding or bolt-fastening.

Figure 7:
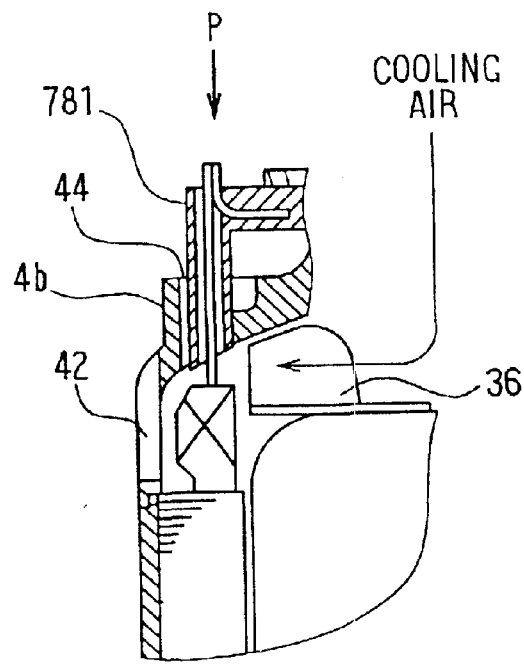
FIG. 7 is a fragmentary cross-sectional view illustrating the connection unit.
Figure 8:
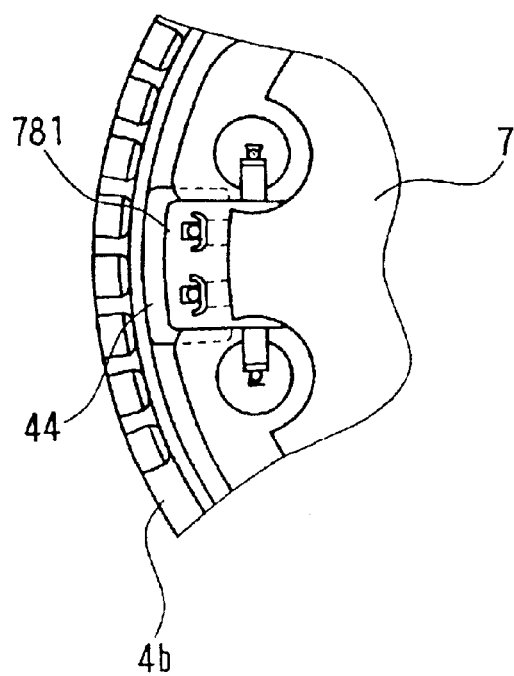
FIG. 8 is a view illustrating the connection unit viewed from position P in FIG. 7.
Figure 9:
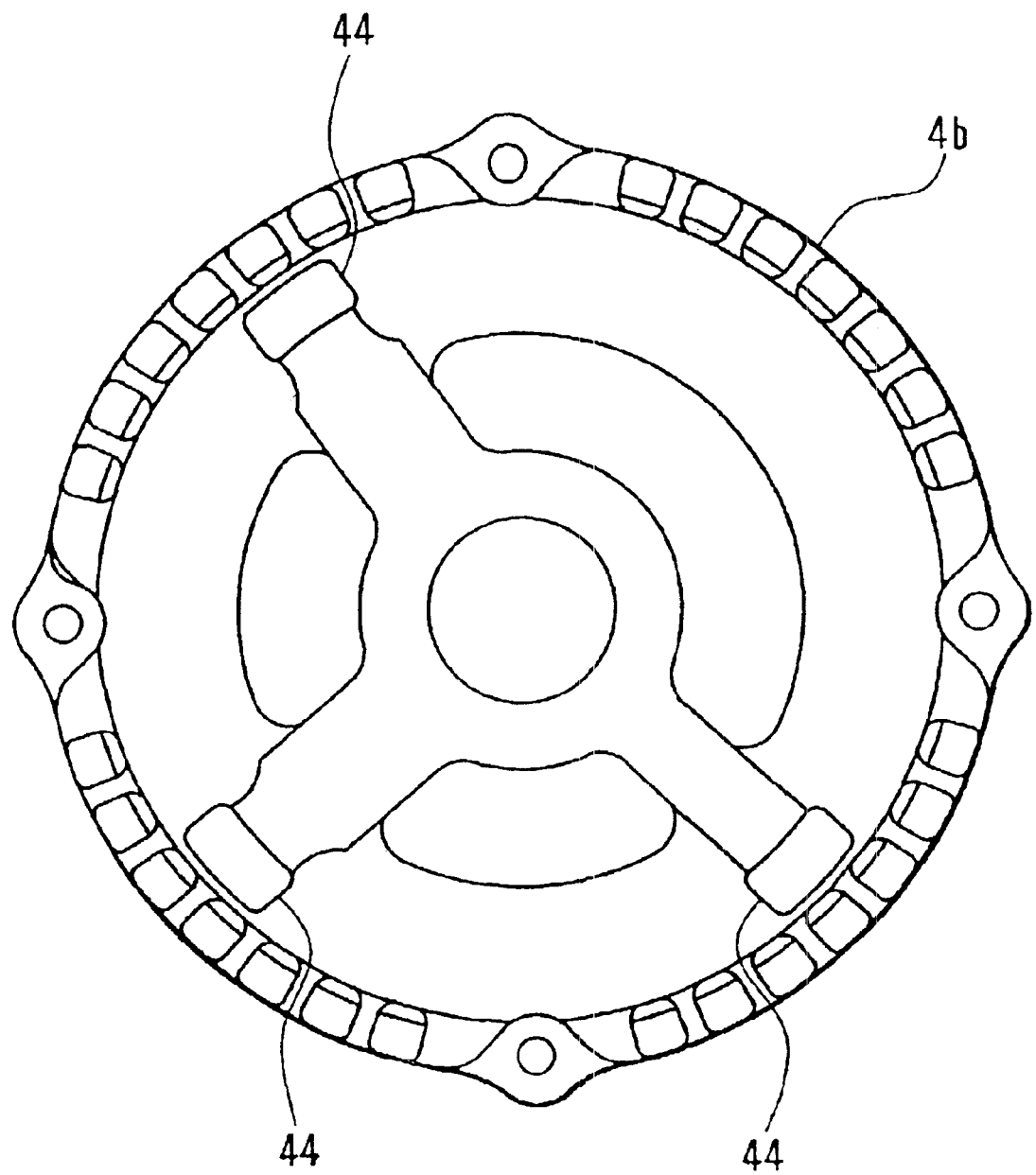
FIG. 9 is a plan view of a rear frame of the ac generator.

As shown in FIGS. 7, 8, and 9, first terminal member 781 is inserted into one of three lead-wire-holes 44 formed coaxially at the end wall 100 of rear frame 4b. Other two lead-wire-holes 44, are also formed at the portions of rear frame 4a to correspond to second and third terminal members 782 and 783. In the preferred embodiment, the number of lead-wire-holes 44 equals to the number of phases (e.g. three).

If neutral diode circuits are connected to the neutral points N1 and N2 in a known manner, one more lead-wire-hole for another terminal member is necessary to hold two more output lead wires. Thus, the number of lead-wire-holes are minimized so that irregularities of the rear frame's wall surface opposite rear cooling fan 36 can be minimized. This prevents the fan noise effectively. The number of the lead-wire holes does not change even if the star-connected three-phase winding is changed to Δ-connected three-phase windings.

Second terminal member 782 for output lead wires V1 and W1 and third terminal member 783 for output lead wires Z1 and U1 are the same in structure.

Figure 10:
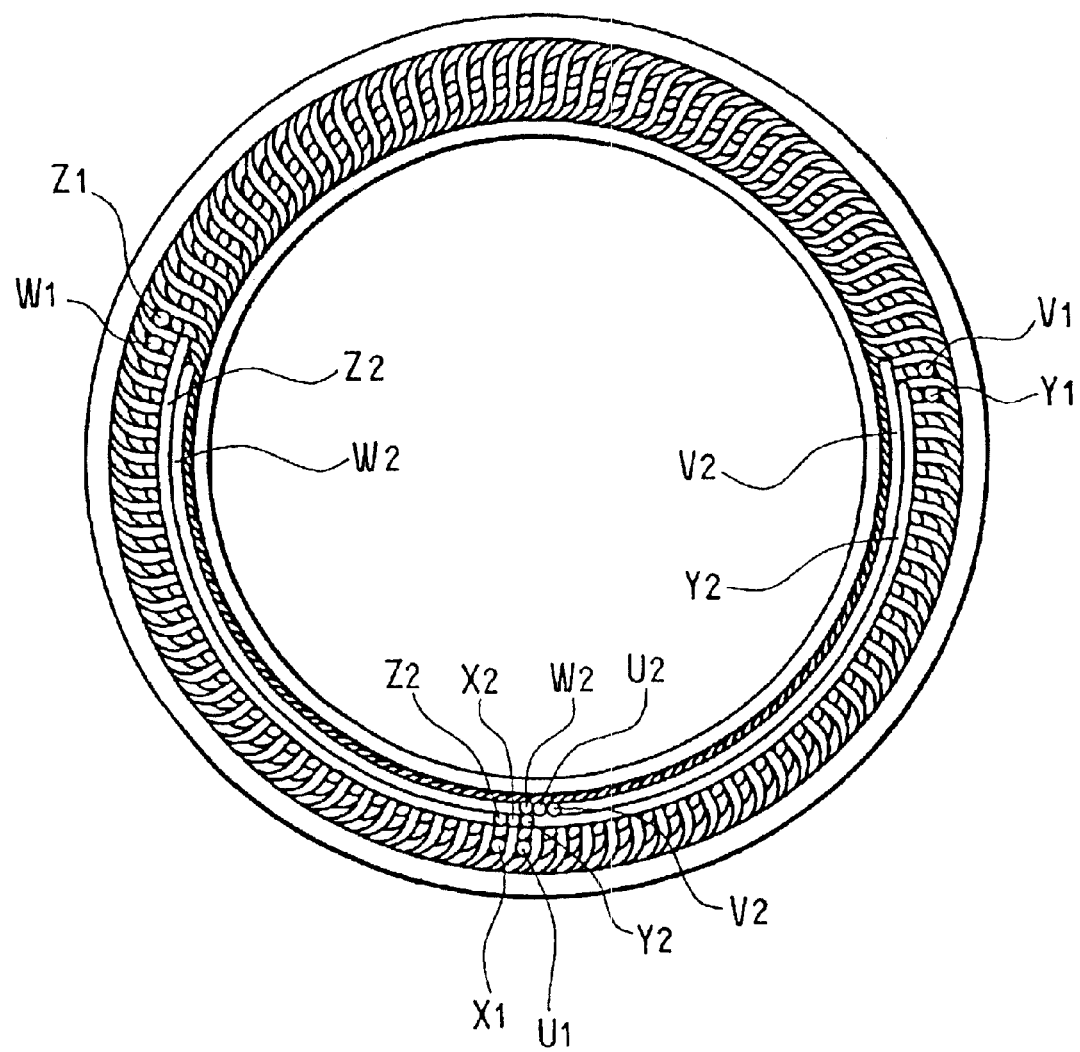
FIG. 10 is a variation of the stator shown in FIG. 3.

A variation of stator winding 2 according to the preferred embodiment is described with reference to FIG. 10.

Output lead wire Z1 of first winding 23a and output lead wire W1 respectively extend from portions close to each other to form a first bundle of output lead wires to be held in first terminal member 781; output lead wire Y1 of first winding 23a and output lead wire V1 respectively extend from portions close to each other to form a second bundle of output lead wires to be held in second terminal member 782; and output lead wire X1 of first winding 23a and output lead wire U1 respectively extend from portions close to each other to form a third bundle of output lead wires to be held in third terminal member 783. The third bundle of output lead wires is located at the middle between the first and second bundles of output lead wires. In other words, the third bundle is about 90° in angle spaced apart from the first bundle and from the second bundle.

Neutral lead wires X2, Y2 and Z2 respectively extend from portions in the vicinity where output lead wires X1, Y1, and Z1 extend. Neutral lead wire Z2 further extends counter-clockwise along the axial end surface of the circumferential coil-ends to the portion close to the third bundle of output lead wires, from where the other neutral lead wires X2 and Y2 of second winding 23b extend. Neutral lead wire Y2 further extends clockwise along the axial end surface of the circumferential coil-ends to the other neutral lead wires X2 and Y2 of first winding 23a extend. Three neutral lead wires X2, Y2 and Z2 of first winding 23a are welded or soldered to each other to form first neutral point N1.

Because first winding 23a and second winding 23b are shifted from each other by electric angle 30°, the output voltages of the output lead wires held in each terminal member have a small phase difference therebetween. Therefore, even if the output lead wires of the bundle are short-circuited to each other, at least a portion of the output power can be provided.

Neutral lead wires U2, V2 and W2 respectively extend in close proximity to output lead wires U1, V1, and W1.

Neutral lead wire V2 further extends counter-clockwise along the axial end surface of the circumferential coil-ends, and neutral lead wire W2 further extends clockwise along the axial end surface of the circumferential coil-ends, so that they meet at neutral lead wire U2. Three neutral lead wires U2, V2 and W2 of second winding 23b are welded or soldered to each other to form second neutral point N2. Thus, two neutral points N1 and N2 can be formed at the coil-end portions remote from each other.

It is also possible to gather two output lead wires other than those described above to form a bundle of output lead wires to be held in a terminal member in the similar manner.

Figure 11:
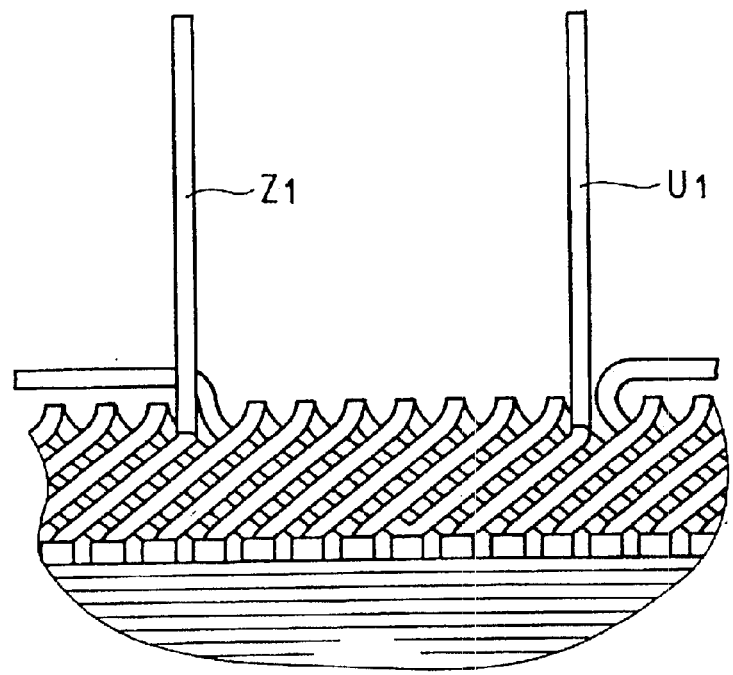
FIG. 11 is a fragmentary side view illustrating a variation of the stator.

In FIG. 11, two output lead wires. Z1 and U1 extend from portions relatively remote from each other.

Figure 12:
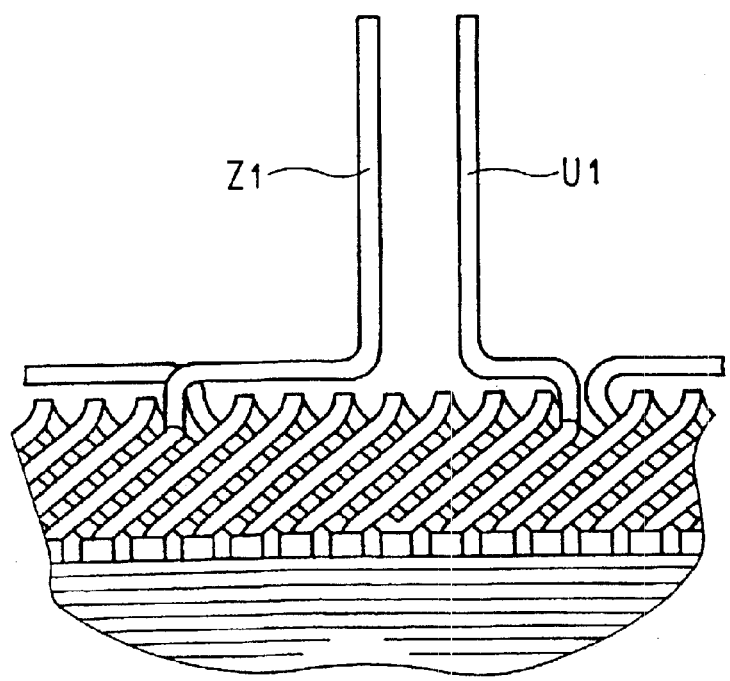
FIG. 12 is a fragmentary side view illustrating a variation of the stator.

In FIG. 12, two output lead wires Z1 and U1 shown in FIG. 11 are formed in a crank-shape to be substituted for the stator shown in FIG. 1. The crank-shape can prevent deformation of the output lead wires.

The terminal members can be separated from the connection unit.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An ac generator for a vehicle, comprising:

a rotor;

a stator disposed around said rotor, said stator having a cylindrical stator core and a pair of multi-phase stator windings disuosed regularly in said cylindrical core to form coil ends at opposite axial ends of said stator core, and a frame for supporting said rotor and said stator;

wherein one of said pair of multi-phase stator windings has a first group of vhase windings and a plurality of output lead wires extending outward from a first circumferential range of the coil end thereof, and the other multi-vhase stator winding has a second aroun of uhase windings and a niurality of outout lead wires extending outward from a second circumferential range of the coil end thereof;

each of said first and second circumferential ranges is about 90 degrees in mechanical angle and disposed adjacent to another without overlapping so that each of the outout lead wires can have enouah circumferential snace to be connected with ease.

2. The ac generator as claimed in claim 1, wherein each of said pair of said multi-phase stator windings comprises three phase-windings.

3. The ac generator as claimed in claim 2, wherein neutral wires extend from respective ends of said three phase-windings of each of said stator windings are connected together to form a neutral point of a star-connected winding, and output wires extend from respective other ends of said three phase-windings.

4. The ac generator as claimed in claim 3, wherein said neutral point is disposed near a coil end of said stator windings.

5. The ac generator as claimed in claim 3, those of said neutral wires of one of said stator windings are spaced apart from others of said neutral wires of the other stator winding.

* * * * *